United States Patent
Wang et al.

(10) Patent No.: US 6,446,448 B1
(45) Date of Patent: Sep. 10, 2002

(54) COOLING TOWER FOR AUTOMATICALLY ADJUSTING FLOW RATES OF COOLING WATER AND COOLING AIR WITH VARIATIONS OF A LOAD

(76) Inventors: Chi-Yi Wang, Fl. 3, No. 8, Wufu St., Toufen Jen, Miaoli (TW), 351; Wen-Cheng Huang, No. 9, Lane 2, Sec. 2, Jungshing Rd., Judung Jen, Hsinchu (TW), 310

( * ) Notice: Subject to any disclaimer, the term of this patent is extended or adjusted under 35 U.S.C. 154(b) by 0 days.

(21) Appl. No.: 09/888,550

(22) Filed: Jun. 26, 2001

(51) Int. Cl.$^7$ ............................................... F25B 39/04
(52) U.S. Cl. ............................................. 62/183; 62/305
(58) Field of Search ........................... 236/44 B; 62/183, 62/305

(56) References Cited

U.S. PATENT DOCUMENTS

| | | | | |
|---|---|---|---|---|
| 4,085,594 A | * | 4/1978 | Mayer | 236/1 E |
| 4,313,310 A | * | 2/1982 | Kobayashi et al. | 62/175 |
| 4,478,767 A | * | 10/1984 | Watanabe et al. | 261/110 |
| 4,487,026 A | * | 12/1984 | Alfano | 62/101 |
| 5,040,377 A | * | 8/1991 | Braun et al. | 165/299 |
| 5,050,394 A | * | 9/1991 | Dudley et al. | 62/115 |
| 6,047,555 A | * | 4/2000 | Weng | 62/171 |
| 6,257,007 B1 | * | 7/2001 | Hartman | 62/183 |

* cited by examiner

Primary Examiner—William E. Tapolcai
(74) Attorney, Agent, or Firm—Rosenberg, Klein & Lee

(57) ABSTRACT

A cooling tower for automatically adjusting flow rates of cooling water and cooling air with variations of a load comprises a plurality of thermometers; a hygrometer; at least one controllers; a cooling water pump; and at least one cooling towers connected in parallel. The desired data, such as optimum allowance operating range, heat transferring property of cooling towers, outer gas bulb temperature, approach and relations therebetween are calculated numerically and then are built in the controller. As the cooling tower is operated, by the measuring of the thermometer, messages are transferred to the controller, the practical data and predetermined data are compared in the controller so as to acquire an optimum cooling water flow and cooling air flow. Then, the controllers are used to control the cooling fan in the cooling pump and cooling towers. Thus, an optimum flow rate is acquired. Therefore, the power is saved. The flow rate of the present invention is changed with the load of the ice water mainframe. Only the flow rate of the cooling air is adjusted, but also the flow rate of cooling water is adjusted. The power of the cooling towers is saved greatly.

10 Claims, 5 Drawing Sheets

COOLING TOWER FOR AUTOMATICALLY ADJUSTING FLOW RATES OF COOLING WATER AND COOLING AIR WITH VARIATIONS OF A LOAD

BACKGROUND OF THE INVENTION

With the advance of human life, more and more air conditioner are used so that the consumed power of the air conditioner becomes the main part of the power consumption. This is the primary reason that the peak power consumption in the summer can not be reduced effectively. How to improve the efficiency of air conditioner is an important subject of the power policy all over the world.

The primary components and operational principle of the air conditioner are illustrated in FIG. 1. Basically, the air conditioner includes five steps for performing heat exchange. From the indoor air condition load at the left side, the process includes the steps of heat exchange between the indoor air and the cooling coil pipe (4); heat exchange between the ice water and the refrigerant in the evaporator (3); heat exchange between the refrigerant and the cooling water in the condenser (2); finally, heat exchange between the cooling water and the outdoor air in the cooling tower. The present invention is primarily aimed at the final heat exchange process of "heat exchange between the cooling water and the outdoor air in the cooling tower". A novel method for saving power is disclosed, and thereby the power consumption of a central air conditioner system is reduced.

SUMMARY OF THE INVENTION

Accordingly, the primary object of the present invention is to provide a cooling tower for automatically adjusting flow rates of cooling water and cooling air with variations of a load comprising a plurality of thermometers; a hygrometer; at least one controller; a cooling water pump; and at least one cooling tower connected in parallel. The desired data, such as optimum allowance operating range, heat transferring property of cooling towers, outer gas bulb temperature, approach and relations therebetween are calculated numerically and then are built in the controller. As the cooling tower is operated, by the measuring of the thermometer, messages are transferred to the controller, the practical data and predetermined data are compared in the controller so as to acquire an optimum cooling water flow rate and cooling air flow rate. Then, the controllers are used to control the cooling fan in the cooling tower and cooling water plump. Thus, an optimum flow rate is acquired. Therefore, the power is saved. The flow rate of the present invention is changed with the load of the condenser. Not only the flow rate of the cooling air is adjusted, but also the flow rate of cooling water is adjusted. The power of the cooling towers are saved greatly.

DETAILED DESCRIPTION OF THE INVENTION

Figure 1:
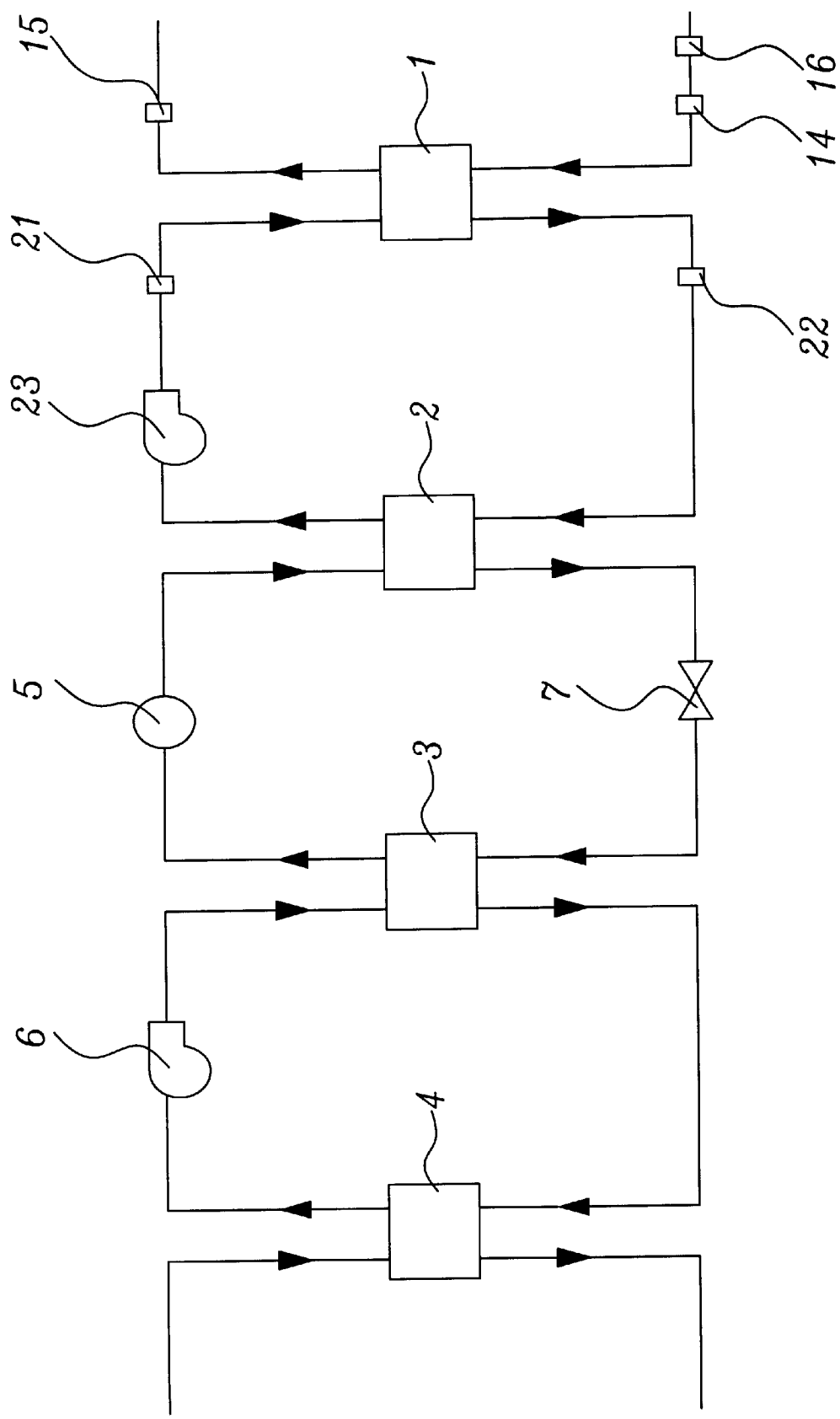
FIG. 1 shows the air conditioner according to the present invention.
Figure 2:
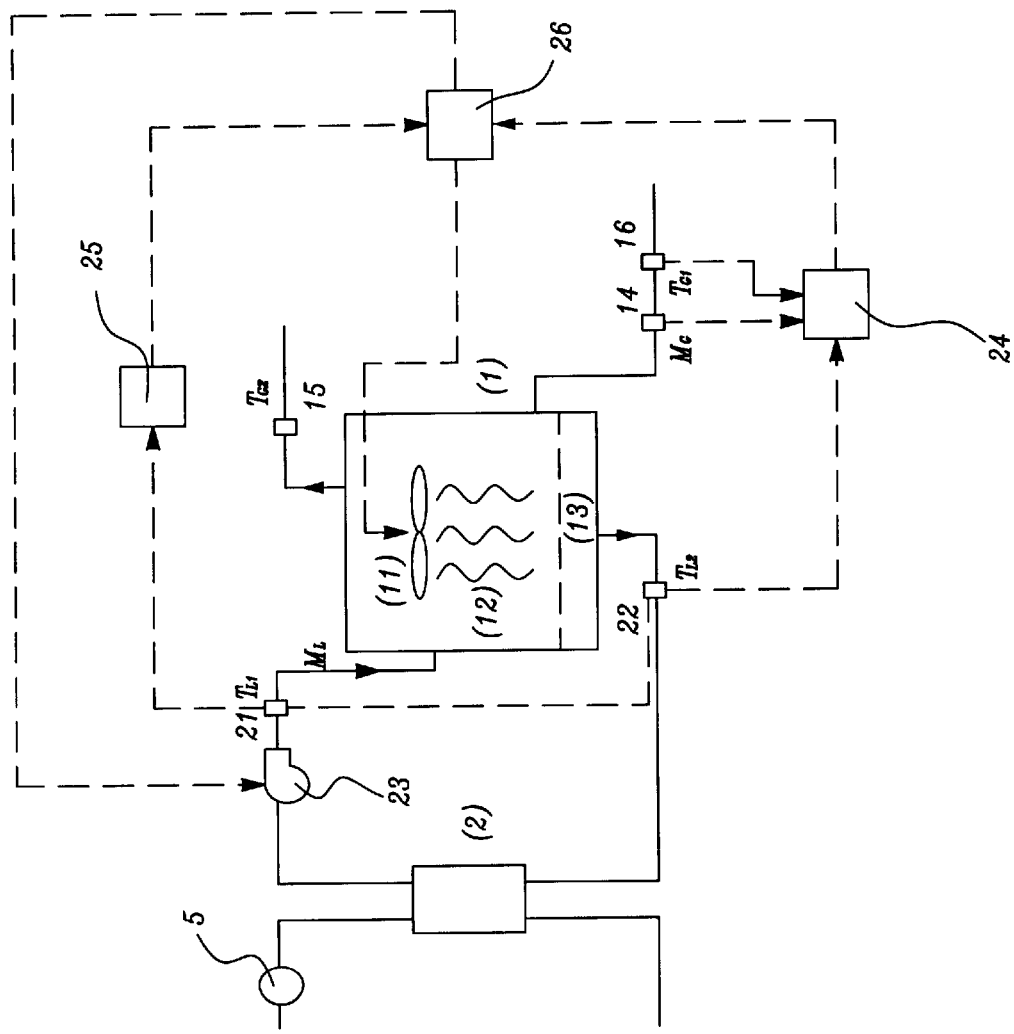
FIG. 2 shows the operation of the condenser and the cooling tower in the present invention.

The operation between a condenser and a cooling tower according to the present invention is illustrated in FIG. 2 in detail. $M_L$ is the flow rate of cooling water for cooling the working fluid (refrigerant) in the condenser, and thus the temperature of the cooling water is increased to $T_{L1}$ and then flows out from the condenser. Then the heat of cooling water is transferred to the inlet air of the cooling tower. In general, due to the gravitation force, the high temperature ($T_{L1}$) cooling water flows through the cooling plates (12) of the cooling tower from the inlet of the cooling tower, and then flows to the storage tank (13) at the bottom of the cooling tower. To cool the cooling water flowing downwards, in general, an air extracting fan (11) is used to extract outer low temperature air with a flow rate of $M_G$, and a temperature of $T_{G1}$ from the inlet at the lower side of the cooling tower so that the air flows upwards to cool the cooling water flowing downwards. The cooling air absorbs the heat from the high temperature cooling water. As the air leaves from the upper side of the cooling tower, it has a temperature of $T_{G2}$. Strictly speaking, due to the evaporation, the flow rate of air will increase slightly. On the contrary, as the cooling water is cooled from a high temperature $T_{L1}$ to a lower temperature $T_{L2}$, the flow rate will slightly decrease due to evaporation. For facilitating the following analysis, the flow rates of $M_G$ and $M_L$ are regarded as constanst.

Figure 3:
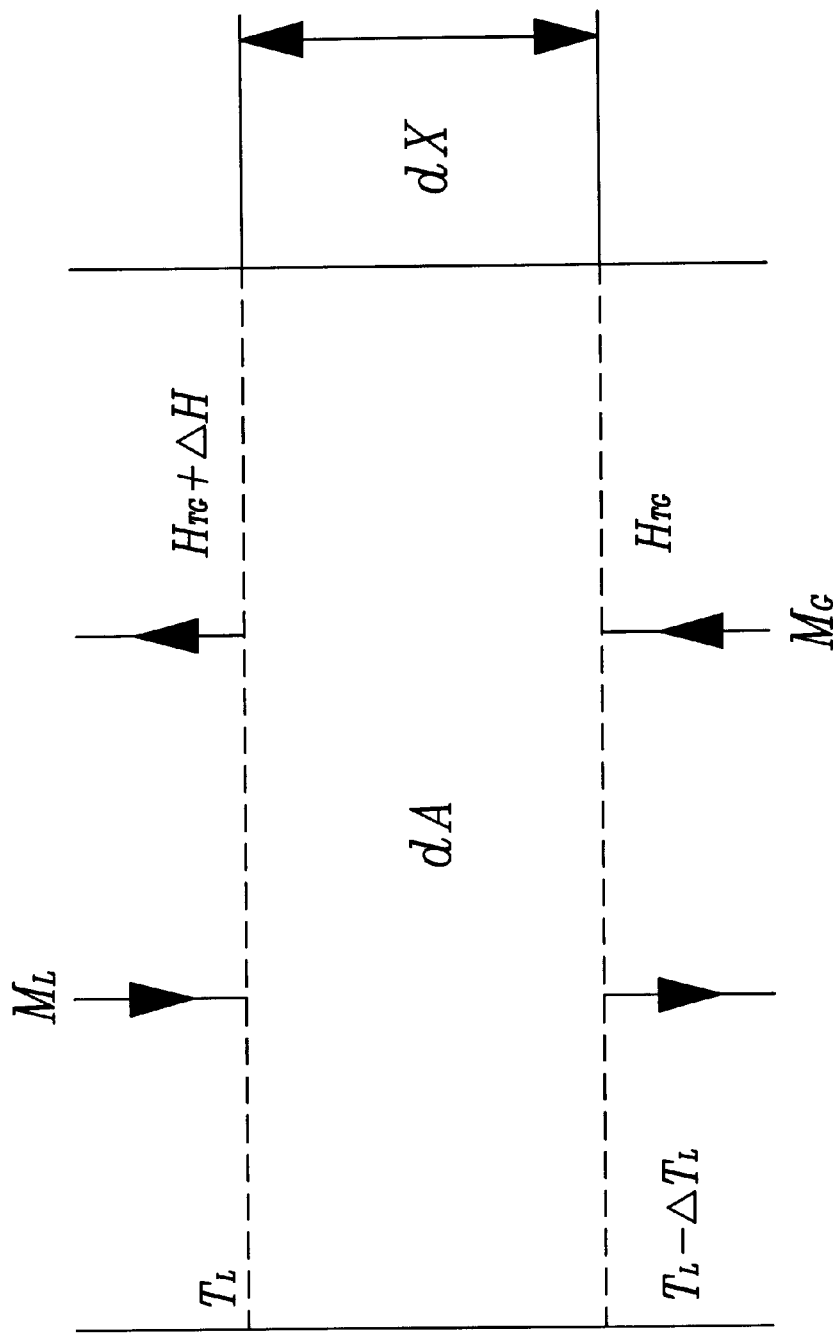
FIG. 3 shows the heat equilibrium in a infinitesimal distance.

Due to energy conservation, the total thermal energy from the cooling water flowing from the upper side of the cooling tower to the lower side therefore must be equal to the total thermal energy from the cooling air flowing from the lower side of the cooling tower to the upper side. From a microview point, the heat exchange between the cooling water and cooling air in a differential space dA is illustrated in FIG. 3.

$$dQ_L = -M_L \times C_L \times (\Delta T_L) \tag{1}$$

where $\Delta T_L$ is the temperature difference in the dA, and $C_L$ is the specific heat of the cooling water, this value is assumed to be a constant. The negative value in the equation represents that the heat is transferred out.

Similarly, the cooling air acquires a heat $dQ_G$:

$$dQ_G = M_G \times (\Delta H) \tag{2}$$

where $\Delta H$ is the increment of enthalpy of air per unit mass in space dA, it can be obtained from the following equation:

$$\Delta H = H_{(TG+\Delta TG)} - H_{(TG)} \tag{3}$$

where $H_{(TG)}$ and $H_{(TG+\Delta TG)}$ are the enthalpy of the air entering into and leaving from the differential space, equations (1) and (2) must be equal to each other, and thus:

$$\Delta H = -\frac{M_L}{M_G} \times C_L \times (\Delta T_L) \tag{4}$$

In general for industrial application, $dQ_G$ can be approximately expressed as follows.

$$dQ_G = \frac{f}{k}(H_S - H)dA \tag{5}$$

where f is the convection heat coefficient, k is determined by the properties of the cooling liquid and cooling air, which is approximately equal to a constant. H is the enthalpy of unsaturated air in the space A. $H_S$ is the enthalpy of the saturated air with respect to the surface temperature of the cooling water (close to the temperature of cooling water) in the space dA. H and $H_S$ are temperature functions. ($H_S$–H) represents the heat transferring from the air on the surface of the cooling water to the environmental air in this space dA.

If the differential space dA is expanded to the whole cooling tower, then the follow equation is derived.

$$\int_{T_{L1}}^{T_{L2}} M_L \times C_L \, dT = \int_0^A \frac{f}{k}(H_S - H) \, dA \tag{6}$$

where A represents the total heat transfer area of the cooling plates (12) in the cooling tower. Equation (6) can be rewritten as:

$$\int_0^A \frac{f}{k} dA = \frac{fA}{k} = -\int_{T_{L1}}^{T_{L2}} \frac{M_L \times C_L}{(H_S - H)} dT_L \tag{7}$$

In practical calculation, the following equation is used:

$$\frac{fA}{k} = -M_L \times C_L \times (T_{L2} - T_{L1}) \sum \frac{1}{(H_S - H)} \tag{8}$$

where ($H_S - H$) represents average enthalpy difference in the space dA for per unit air mass.

$$\sum \frac{1}{(H_S - H)}$$

is the sum of the $$\frac{1}{(H_S - H)}$$

of the interval dA for the whole space A. ($T_{L2} - T_{L1}$) is the temperature difference in the total space A. If the value in the right side of equation (8) is known, a numerical method can be used to acquire the $$\frac{fA}{k}$$

at the left side of the equation, or if the value of $$\frac{fA}{k}$$

is known, then the parameters in the right side of the equation can be obtained.

The numerical method used in the present invention will be roughly described in the following. The total number of interval dA is obtained by the temperature difference ($T_{L2} - T_{L1}$) between the inlet water and outlet water divided by the temperature difference $\Delta T$ in the interval dA. In general, it is convenient that the $\Delta T$ is taken a value of 1° F. If ($T_{L2} - T_{L1}$)=10° F., then there are 10 intervals of dA (10° F.÷1° F.=10) Besides, if $T_{L1}$ and $T_{L2}$ are some determined values, the upper and lower limits of the temperature in the interval dA can be obtained. Thereby, the respective $H_S$ is acquired. Furthermore, the lower limit of the temperature in the total space A is $T_{L2}$ so as to derive the respective. $\Delta H$ the increment of enthalpy of per unit air mass in space dA is acquired from equation (4), then $H + \Delta H$ is the enthalpy value for the air in the next interval dA. Similarly, the $H_S$ and H for all interval dAs' can be obtained. By calculating the sum of the $$\frac{1}{(H_S - H)},$$

and $$\sum \frac{1}{(H_S - H)}$$

is derived. Then $$\frac{fA}{k}$$

can obtained from equation (8).

In general, as a manufacture sells a cooling tower, the data of water flow rate, $M_L$, flow rate $M_G$ of the cooling air, range, RT, and approach AP as the cooling tower with a thermal load of 100%, the upper limit $T_{L2}$ of temperature for the cooling water flowing into the condenser, and the lower limit $T_{L1}$ as the cooling water left from the condenser and the wet bulb temperature WB of external air are provided.

The approach AP means the difference of the temperature $T_{L2}$ as the cooling water leaves from the cooling tower and the wet bulb temperature as the air flows into the cooling tower, namely:

$$T_{L2} = WB + AP \tag{9}$$

The range RT means the temperature difference of the cooling water entering into and leaving from the cooling tower, namely:

$$RT = T_{L1} - T_{L2} \tag{10}$$

While the load $Q_L$ of the condenser 2 can be derived from the following equation:

$$Q_L = M_L \times C_L \times (T_{L1} - T_{L2}) \tag{11}$$

After substitution, the following equation is acquired:

$$Q_L = M_L \times C_L \times RT \tag{12}$$

The total heat $Q_G$ from the cooling air is:

$$Q_G = M_G \times \Sigma(H_S - H) = Q_L \tag{13}$$

In practical calculation about the performance of a cooling tower, the wet bulb temperature WB, the flow rate of the cooling water $M_L$ and the set ratio MLG of the cooling air entering into the cooling tower can be measured by measuring devices. Then $T_{L2}$ and $T_{L1}$ are calculated. These values are substituted into equation (8) for obtaining $$\frac{fA}{k}.$$

From the physical meaning of f, A and k, $$\frac{fA}{k}$$

can be considered as a meaningful performance coefficients of the cooling tower. When $M_L$, MLG and WB are not changed, then the performance coefficient $$\frac{fA}{k}$$

of the cooling tower must be fixed. By this relation, by numerical method, the variations of $T_{L2}$, $T_{L1}$ and AP are acquired reversely as the thermal load of the condenser 2 changed (i.e., RT changed). As the variations of $T_{L2}$ and $T_{L1}$ are obtained, by numerical calculation and adjusting the ratio of the cooling water $M_L$ and MLG, $T_{L2}$ and $T_{L1}$ will achieve an optimum condition. This adjusting process will save energy effectively. The primary content of this patent will be further described in the following.

EMBODIMENT 1

An operation data for a certain product is:

Flow rate of cooling water: $M_L$=30 GPM (30 gal per minute)

Flow rate of cooling air $M_G$=25 GPM (25 gal per minute)

Flow rate ratio of the cooling water to the cooling air MLG ($M_L/M_G$)=1.2

Range RT=10° F.

Approach AP=7° F.

Wet bulb temperature for the cooling air flowing into the cooling tower WB=83° F.

Then, the temperatures of $T_{L2}$ and $T_{L1}$ are:

$$T_{L2}=WB+AP=83° F.+7° F.=90° F.$$

$$T_{L1}=T_{L2}+RT=90° F.+10° F.=100° F.$$

Data ($T_{L2}$=90° F., $T_{L1}$=100° F.) are the temperature limits as the cooling water flows into or out of the condenser as WB=83° F., i.e., the most strict operation condition. In general, in this operation condition, the electric power has an optimum efficiency.

Then, the load $Q_c$ of the condenser is $$Q_C=M_L \times C_L \times (T_{L1}-T_{L2}) \approx 15000 \text{ Btu/hr}$$

$C_L$=1 Btu/lb-° F.

Value of $$\frac{fA}{k}$$

is obtained from equation (8)

$$\frac{fA}{k}=0.976$$

EMBODIMENT 2

$T_{L1}$ and $T_{L2}$ Changed, as the Thermal Load of the Condenser is Reduced

As the operation condition $M_L$, $M_G$ and WB are identical to example 1, and the thermal load of the condenser is reduced, then the variations of $T_{L1}$ and $T_{L2}$ of the inlet and outlet temperatures of the cooling water can be obtained from the temperature measurers 21, and 22 of the condenser. The values after changed are $T_{L1}$=95° F., $T_{L2}$=88° F.

From equation (11), thermal load $Q_C$ can be obtained:

$$Q_C=M_L \times C_L \times (T_{L1}-T_{L2}) \approx 10500 \text{ Btu/hr}$$

As compared with the $Q_C$ in example 1, about 70% (=10500/15000), i.e., a decrement of 30%. Since in this time, the operation condition $M_L$, $M_G$ and Wb are identical to example 1, the value of $$\frac{fA}{k}$$

must be identical to example 1, i.e., 0.976. Substituting $$\frac{fA}{k}=0.976$$

into equation (8), namely, a set of respective $T_{L1}$ and $T_{L2}$ acquired. By numerical calculation, it is known that $T_{L1}$=95.24° F., $T_{L2}$=88.24° F. The value from calculation are almost identical to the measuring values so that the theoretical results are exactly matched to the practical measuring results. In the following embodiment, a thermal load of 70% is used as an example,

EMBODIMENT 3

The Actions Adapted as the Thermal Load of the Condenser is Reduced

The flow rate $M_G$ of the cooling air is decreased, so that temperature $T_{L2}$ of the cooling water entering into the condenser is incremented to the upper limit of 90° F. in example 1 from the 88° F. in example 2 for saving power.

It is appreciated from example 2, as the thermal load of the condenser is reduced to 70% of example 1, the temperature $T_{L2}$ of the cooling water entering into the condenser will become 88° F. for saving power. Now if the flow rate $M_G$ of the cooling air is reduced, the cooling ability of the cooling tower will also reduce so that the temperature of the cooling water will increase. Since the upper limit of the temperature of the cooling water entering into the condenser is 90° F., by the control of the thermometer 22 of the cooling water, the object can be achieved. Thus, power is saved. This way for saving power is recently widely used. The Taiwan Patent Publication No. 305447, "A cooling tower with automatically adjustable energy with the variation of load" disclosed one such design. From aforesaid numerical calculation, the current condition is:

$$T_{L1}=97° F., \quad T_{L2}=90° F., \quad \frac{fA}{k}=2.802$$

The flow rate of the cooling air is changed, and thus value of $$\frac{fA}{k}$$

also changed. Now, the thermal load $Q_C$ of the condenser is:

$$Q_C=M_L \times C_L \times (T_{L1}-T_{L2}) \approx 10500 \text{Btu/hr}$$

which is also 70% of that in example 1.

EMBODIMENT 4

As the Thermal Load of the Condenser is Reduced

Now the flow rate $M_L$ of the cooling water and $M_G$ of the cooling air are reduced at the same time so that the temperatures of the cooling waters entering into and leaving from the condenser are increased from $T_{L1}=95°$ F., and $T_{L2}=88°$ F. in Embodiment 2 to the upper limit temperatures of $T_{L1}=100°$ F., and $T_{L2}=90°$ F.

In this method, the flow rate $M_L$ of cooling water is firstly reduced, and then the flow rate $M_G$ is reduced secondarily. The power is further saved than that disclosed in example 3 so that energy is saved more effectively. This is the main content of the present invention.

It is appreciated from Example 3, the temperatures of water flowing into and leaving from the condenser can become $T_{L1}=97°$ F., $T_{L2}=90°$ F. as the flow rate of the cooling air is reduced. The temperature difference $\Delta T$ is $7°$ F. While as the upper limits of the temperatures of the condenser are $T_{L1}=100°$ F. and $T_{L2}=90°$ F., then temperature difference $\Delta T$ is $10°$ F. Therefore, under the condition of retaining $Q_C$ being 10500 Btu/hr and $\Delta T$ being $10°$ F., the flow rate of the cooling water is 70% of the original one (30 GPM) from equation (1). Therefore, $M_L=21$ GPM. By substituting $T_{L1}=100°$ F., $T_{L2}=90°$ F. and $M_L=21$ GPM into equation (13), it is obtained that $M_G=18$ GPM. This is further substituted into equation (8), then value of $$\frac{fA}{k}$$

becomes 0.960. Thus, the thermal load $Q_C$ of the condenser can be obtained from the following evaporator.

$$Q_C = M_L \times C_L \times (T_{L1} - T_{L2}) = 21 \times C_L \times (100° \text{ F.} - 90° \text{ F.}) \approx 10500 \text{ Btu/hr}$$

However, the value is still 10500 Btu/hr. Thus the flow rate of the cooling water is reduced and the flow rate of the cooling air is also reduced. Under the condition of effectively reducing cooling air, the operation range still retains in that of example 1.

From the calculation result, it can be verified that as the thermal load is reduced to 70%, the flow rate of the cooling water is about $$70\% \left( = \frac{21 \text{ GPM}}{30 \text{ GPM}} \right)$$

of the original one (example 1). From this result, a method for controlling the flow rate is:

Due to the decreasement of the thermal load of the condenser the temperatures are reduced to $T_{L1}=95°$ F. and $T_{L2}=88°$ F. obtained from the thermometers 21, 22 of the cooling water. The temperature difference is $\Delta T=7°$ F. The temperature difference limit between $T_{L1}$ and $T_{L2}$ of the condenser is $\Delta T=10°$ F.($=100°$ F.$-90°$ F.). The ratio of the two is 0.7($=7/10$). The flow rate of the cooling water is reduced to 30% from that in the upper water flow rate 30 GPM reduced with 30% to be 21 $_{GPM(=}$30 GPM$\times$0.7). Then the flow rate $M_G$ of the cooling air is further adjusted until the readings of the thermometers achieve $T_{L1}=100°$ F. and $T_{L2}=90°$ F. Since the energy for transferring cooling water is farther larger than that for transferring cooling air. If it is desired to reduce the flow rate of the cooling water, the consumed power of the water pump 23 can be saved greatly. Therefore, the power saving of the present invention is farther better than the prior art disclosed in example 3, moreover, it is proved by practical application to be a correct and available method.

EMBODIMENT 5

As the thermal load of the condenser is 100% and the environment becomes cold, so that the environment wet bulk temperature WB is reduced to $81°$ F. from $83°$ F. (example 1), the way for adjusting the temperatures $T_{L1}$ and $T_{L2}$ of the cooling water is described herebelow.

Figure 5:
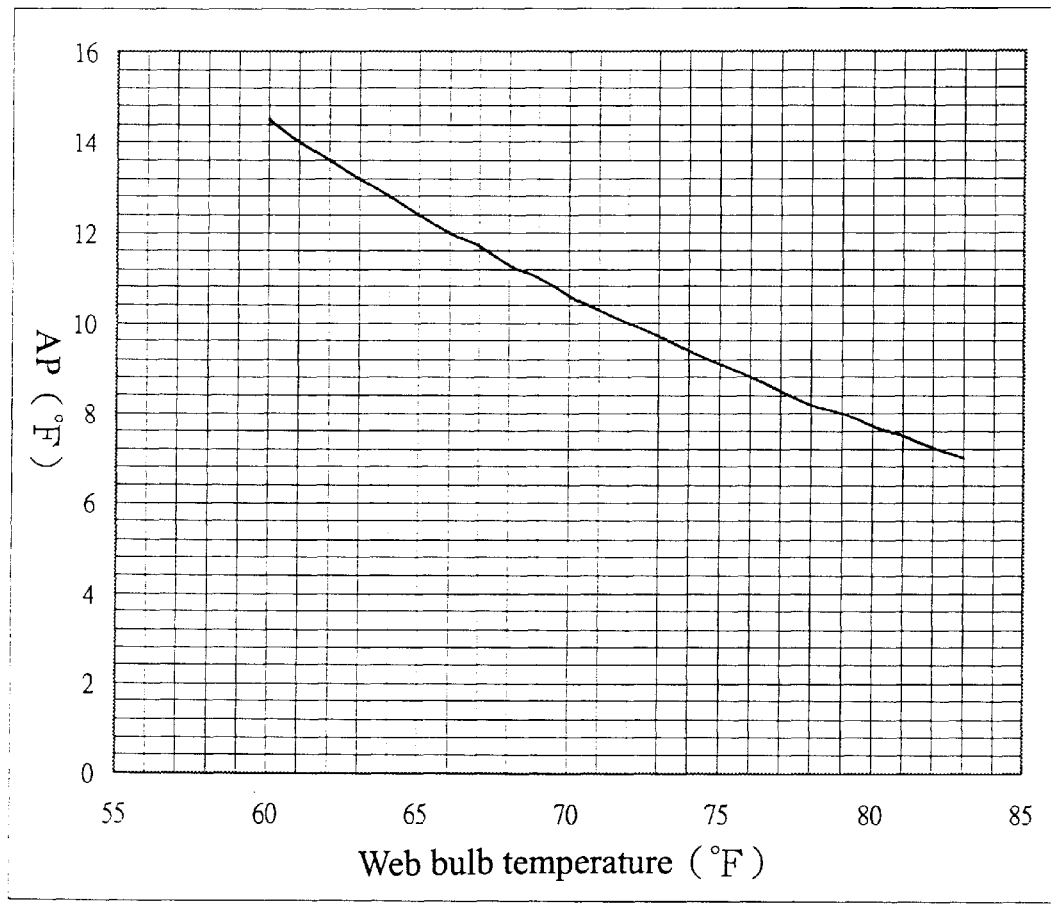
FIG. 5 shows the relation of the outer wet bulb temperature with the approach.

Since the thermal load of the condenser is still 100%, the flow rates of the cooling water and cooling air are $M_L=30$ GPM and $M_G=25$ GPM. The MLG is still 1.2($=30/25$). The 100% thermal load $Q_C$ of the condenser is 15000 Btu/hr from example 1, thus value $$\frac{fA}{k}$$

of the cooling tower being 0.976. The range RT is sustained at $10°$ F. Now, the external WB is reduced to $81°$ F., from above condition and aforesaid calculating value, the temperatures of the cooling water entering into and leaving from the condenser, $T_{L1}=98.5°$ F. and $T_{L2}=88.5°$ F., are obtained from above numerical method. Now, the approach AP becomes 7.47 from the original 7.0. Under 100% thermal load of the condenser, the relation between the approach AP and the wet bulb temperature WB as the cooling air entering into the cooling tower may be derived from above numerical method as illustrated in FIG. 5. When WB is $81°$ F., AP is about 7.5. The $T_{L2}$=WB+AP of the cooling water is an optimum value, therefore:

$$T_{L2} = 81° \text{ F.} + 7.5° \text{ F.} = 88.5° \text{ F.}$$

Now, if it is desired to save power, as the way illustrated in example 3, the flow rate $M_G$ of the cooling air is reduced alone so that MLG is 1.65. The power of the fan of the cooling tower is saved so that $T_{L1}=100°$ F. and $T_{L2}=90°$ F., and value of $$\frac{fA}{k}$$

becomes 0.974.

In a general system, the energy from the condenser (primarily from a compressor 5) is 15 times of the work from cooling tower (primarily from fan 11). When the flow rate of the cooling air is decreased so that $T_{L2}$ is increased to $90°$ F. from $88.5°$ F. The power of the fan is saved, thus $T_{L1}$ increasing from $98.5°$ F. to $100°$ F. so that the work of the condenser is increased and the power consumption is also increased. In summary, the effect of saving power can not be achieved. Therefore, the prior art described in example 2 which set a fixed $T_{L2}$ of $90°$ F. can not achieve the object of power saving.

Figure 4:
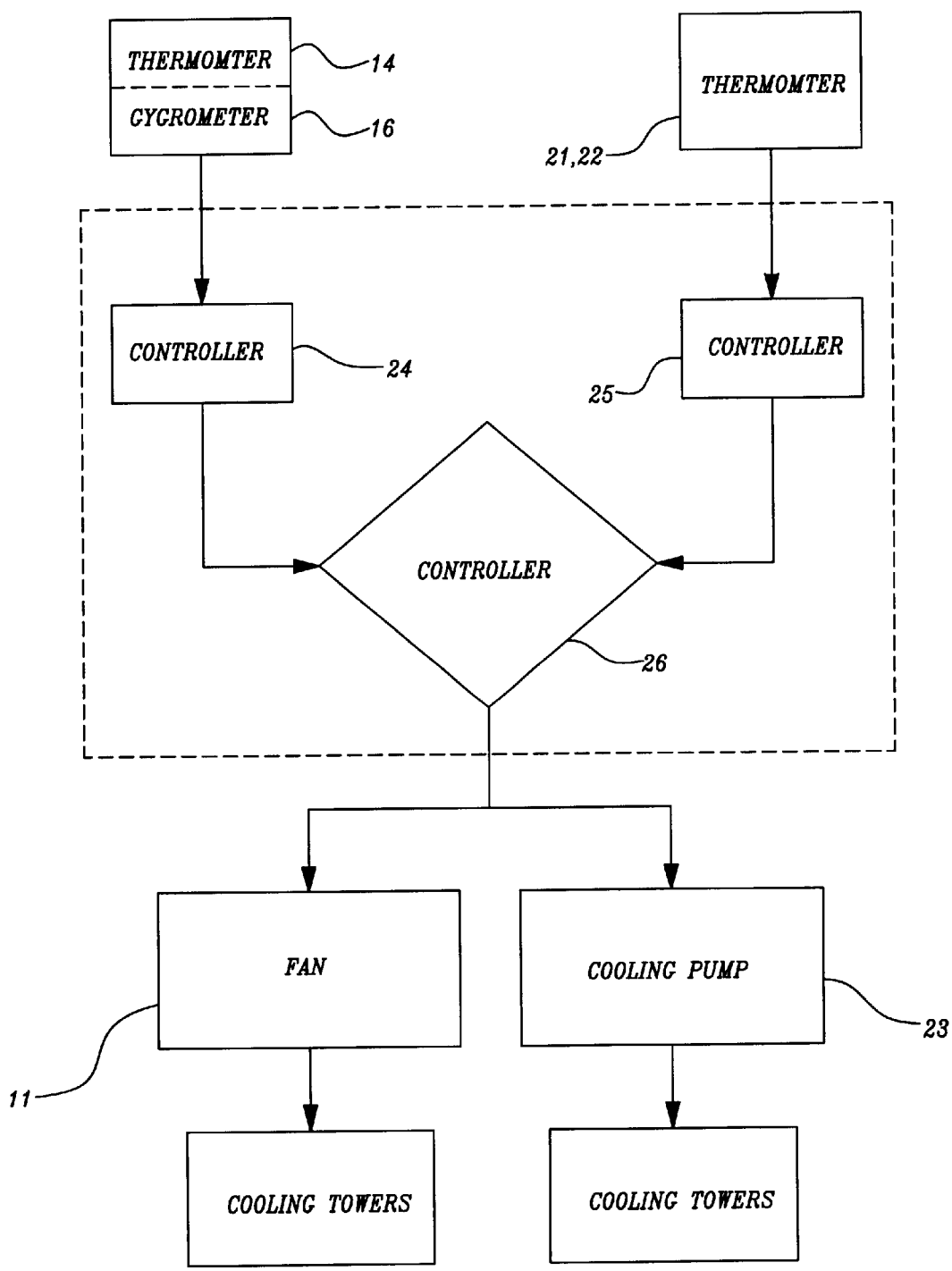
FIG. 4 shows the control structure of the system.

Whereas in the present invention, as illustrated in FIG. 5, a thermometer 14 is used to adjust $T_{L2}$ to $88.5°$ F., under the condition that the flow rates of cooling water and cooling air are still $M_L=30$ GPM and $M_G=25$ GPM, respectively, $T_{L1}$ is $98.5°$ F. Since the temperatures of water flowing into and leaving from the condenser have decreased, it represents that the work of the condenser has reduced. Therefore, the object of power saving is achieved. At this time, if it is desired to increase the flow rate of the cooling air so that the temperature of $T_{L2}$ is lower than $88.5°$ F., it only increases the power consumption. From FIG. 4, it is known, WB plus AP will be the lowest value of $T_{L2}$. When at this time, as the thermal load of the condenser is reduced, it is adjustable according to the method disclosed in FIG. 4. Thus, more power is saved. Therefore, when the wet bulb temperature WB of external air measured by the thermometer 14 of the cooling air is decreased, the upper temperature limit of the cooling water entering into the condenser may be set according to the result of FIG. 4 so as an optimum condition is achieved. That is, power is used effectively.

We claim:

1. A cooling tower for automatically adjusting flow rates of cooling water from a condenser and cooling air with variations of a load comprising:
   at least one controller;
   a plurality of thermometers having outputs coupled to the at least one controller;
   a hygrometer having an output coupled to the at least one controller;
   at least one cooling tower fluidly coupled to the condenser by a pair of cooling water channels; and,
   a cooling water pump coupled to the at the at least one controller and being fluidly coupled in one of the cooling water channels, the cooling water pump having a flow rate controlled by the controller.

2. The cooling tower as claimed in claim 1, wherein the at least one cooling tower includes a cooling fan, and a set of cooling plates for the cooling water to flow thereon.

3. The cooling tower as claimed in claim 2, wherein the cooling fan is coupled to the at least one controller for controlling a flow rate of the cooling air.

4. The cooling tower as claimed in claim 1, wherein the hygrometer is installed external to the at least one cooling tower for measuring a relative humidity of cooling air flowing in the at least one cooling tower.

5. The cooling tower as claimed in claim 1, wherein there are four thermometers, two of which are installed at the cooling water channels between the condenser and the at least one condenser for respectively measuring temperatures of water flowing into and out of the condenser.

6. The cooling tower as claimed in claim 5, wherein the other two thermometers are respectively installed at an inlet and an outlet of the cooling air of the at least one cooling tower for respectively measuring temperatures of the cooling air flowing into and leaving the at least one cooling tower.

7. The cooling tower as claimed in claim 6, wherein there are three controllers, a first of the controllers contains a control program for operating on data captured from the hygrometer and the temperature of the inlet cooling air so as to acquire a wet bulb temperature of the inlet cooling air to be sent to another of the controllers.

8. The cooling tower as claimed in claim 7, wherein a second controller of the three controllers is connected to the thermometers monitoring the temperatures of the cooling water at the inlet and outlet of the condenser.

9. The cooling tower as claimed in claim 8, wherein a third controller of the three controllers is preset with a maximum allowable condition and is connected to the first and second controllers for capturing data representing the acquired gas wet bulb temperature of the inlet cooling air and a difference between the temperature of the inlet and outlet of the cooling water; the captured data being compared with the maximum allowable condition for determining an optimum cooling water flow and the flow rate of cooling air; the third controller sending signals to the cooling pump and the cooling fan to adjust a rotating speed thereof to obtain an optimum flow.

10. The cooling tower as claimed in claim 9, wherein data representing a relationship between the wet bulb temperature and an approach value are stored in the third controller for use in establishing changes in the approach value as the wet bulb temperature changes.

* * * * *